United States Patent [19]

Ett

[11] Patent Number: 5,227,893
[45] Date of Patent: Jul. 13, 1993

[54] PSEUDO-BAR CODE CONTROL OF IMAGE TRANSMISSION

[75] Inventor: Allen H. Ett, Bethesda, Md.

[73] Assignee: International Business Machines Corporation, Armonk, N.Y.

[21] Appl. No.: 606,673

[22] Filed: Oct. 31, 1990

[51] Int. Cl.⁵ .......................................... H04N 1/00
[52] U.S. Cl. ................................. 358/400; 358/403; 358/405; 358/426; 358/434; 358/444
[58] Field of Search ............... 358/400, 402, 403, 404, 358/405, 406, 407, 426, 427, 434, 435, 436, 438, 439, 443, 444, 453; 379/100

[56] References Cited

U.S. PATENT DOCUMENTS

| | | | |
|---|---|---|---|
| 4,384,307 | 5/1983 | Kuzmik et al. | 358/903 |
| 4,499,596 | 2/1985 | Casey et al. | 382/37 |
| 4,528,693 | 7/1985 | Pearson et al. | 382/47 |
| 4,533,956 | 8/1985 | Fedde | 358/432 |
| 4,571,633 | 2/1986 | Kondo | 358/78 |
| 4,590,606 | 5/1986 | Rohrer | 382/7 |
| 4,759,053 | 7/1988 | Satomie et al. | 379/100 |
| 4,802,204 | 1/1989 | Chang | 379/100 |
| 4,839,737 | 6/1989 | Saito | 358/406 |
| 4,843,632 | 6/1989 | Lee et al. | 358/427 |
| 5,115,326 | 5/1992 | Burgess et al. | 358/440 |

FOREIGN PATENT DOCUMENTS 63-214057 9/1988 Japan .
WO8806824 9/1988 PCT Int'l Appl. .

Primary Examiner—Edward L. Coles, Sr.
Assistant Examiner—Jerome Grant, II
Attorney, Agent, or Firm—John E. Hoel; Jeffrey S. LaBaw

[57] ABSTRACT

A method is provided by this invention wherein information needed for indexing or routing of facsimile images transmitted by standard facsimile means using CCITT protocols can be carried in the image in a form which does not interfere with conventional facsimile operation. This indexing information is carried by a pseudo bar code imbedded in the first line or lines of the image. The bar code is machine generated from operator input via a keyboard, and as such is at maximum resolution, without skew, and without scanner sampling errors. The use of multiple lines provides a bar code pattern which can be read by normal bar code reading means. This invention also includes means for extraction of the pseudo bar code from the facsimile image so that its existence is totally transparent to the users.

6 Claims, 10 Drawing Sheets

CODE 39

CODE 128

1st PSEUDO SCAN LINE OF IMAGE

|START| FIELD 1 | FIELD 2 | ooooooooooo STOP
Etc.

Contains Pseudo Bar Code

Generated as Huffman Codes

Would appear as shown if printed with image

CODE 39 Illustrated as Example However any Bar code could be used

Any other error detecting code set could be used

CODE 39 BAR CODE EQUIVALENT

| START | 1 | 2 | 3 | 4 | A | E | 6 | 7 | 8 | 9 | CHECK CHARACTER | ETC. | CHECK | STOP |

Figure 9

STD MH CODES | OPTIMIZED CODES

| RUN LENGTH | WHITE MH CODE | BLACK MH CODE | SPACE CODE | BAR CODE |
|---|---|---|---|---|
| 1 | 000111 | 010 | 0111 | 10 |
| 2 | 0111 | 11 | 1000 | 11 |
| 3 | 1000 | 10 | 1011 | 010 |
| 4 | 1011 | 011 | 1100 | 011 |
| 5 | 1100 | 0011 | ---- | ---- |
| 6 | 1110 | 0010 | ---- | ---- |

CODE 39

10   1000   10   0111   11   0111   10   0111   INTER CHARACTER GAP   0111

1010001001111101111101111100111   Code using optimized MH Codes

0100111010000111111000111101010000111   Code using standard MH Code

PSEUDO-BAR CODE CONTROL OF IMAGE TRANSMISSION

BACKGROUND OF THE INVENTION

Facsimile transmission and reception has become a common means for communicating images over the Public Switched Telephone Networks (PSTN). Conventional facsimile machines use the PSTN to send copies of images to specified recipients anywhere in the world. Generally, a single facsimile machine is used to service several potential recipients. It is therefore a problem to assure that the transmitted document reaches its intended recipient. In conventional facsimile, cover sheets are normally used for the conveyance of addressing and routing information. However, these cover sheets comprise an additional image which is sent prior to the intended images, and use a relatively large amount of resource, PSTN time, facsimile-machine time, paper, etc., for relatively little information. Further, such cover sheets are only human interpretable.

In recent years, the facsimile arts have further advanced with the development of adapter cards and programming, which permit small computers to scan in images, or convert text and graphic data to images which can be transmitted via the PSTN sent by a facsimile modem on the adapter card. In this manner, material can be sent as facsimile images which are never reduced to paper form. The computer also provides improved means for controlling facsimile communications. In other developments, many of the long distance and local telephone companies have begun or have made plans to implement extensive facsimile routing systems and services via the PSTN, controllable by touch tone signals. Rather than a separate cover sheet, a coded command precedes the document, informing the facsimile routing system which recipient or recipients should receive the transmittal image. In other facsimile systems routing and handling information is provided by the use of markable forms similar to the standardized testing forms to carry limited information in machine readable form on the cover sheet.

The Consultative Committee for International Telephone and Telegraph, or CCITT, a standards body for telephony has established recommended standards for facsimile use by member nations. CCITT Group 3 and 4 facsimile systems utilize a compressed digital encoding to minimize the time required for sending the images, and to reduce storage requirements of the compressed images in a store and forward environment.

Other image handling systems exist for the transmission, storage and processing of image data to multiple users using compression techniques and other processing similar to those used in facsimile. For example copending U.S. application Ser. No. 07/559,526 to H. M. Morris et al. entitled "Dual Density Digital Image System" and application Ser. No. 07/211,722 to H. M. Morris et al entitled "Object Management And Distribution System" and hereby incorporated by reference discloses the IBM Image Plus System.

All of the prior art systems require a separate document or coded command to route a transmitted image. The cover sheet document or command can get separated from the image during transmission or routing, the result being that the transmitted image is lost within the system. The cover sheet in particular requires substantial additional resource. The touch tone commands of the prior art are not recognized by facsimile devices which are not incorporated in the particular telephone systems in service.

Bar coding has been used for a number of years for the reliable identification of objects marked with a unique code pattern consisting of black and white stripes of varying width or height. Bar codes have not been used heretofore in facsimile. Most Bar Codes are designed with open code sets, and unique code patterns which provide for nearly positive detection of errors. The use of check characters in the coded field further reduces the likelihood of undetected errors to low values.

This invention combines some of the attributes of commonly used Bar Codes with facsimile in a manner such as to permit the embedding of data needed for indexing, or further routing, within the image in machine readable form, which is transparent to the users.

SUMMARY OF THE INVENTION

It is therefore an object of the present invention to convert alphanumeric information useful for routing or indexing facsimile or other image data for storage and retrieval to a machine readable code, such as but not limited to conventional standard bar codes.

It is another object of the present invention to incorporation of said code pattern into the image portion of a facsimile or other image transmission in such a manner as to be transparent to the system, the network, and users.

It is another object of the invention to directly encode the said bar code means in Modified Huffman code without the need for separately creating the image pattern of the Pseudo bar codes.

It is another object of the invention to recover the Pseudo Bar Code information, converting it to standard computer coded data suitable for re-routing the facsimile or image message, or for indexing of incoming facsimile or image messages in an image storage and retrieval system without operator intervention.

It is another object of the invention to carry coded information embedded within the body of the image in a form such that it is compatible with conventional facsimile systems, and is fully compatible with the facsimile networks under CCITT G3 and G4.

These objects and others are accomplished by a data processing system including a first image station which is capable of inputting a alphanumeric character string, converting that character string to binary bit representation of a pseudo bar code string corresponding to the individual alphanumeric characters within the character string, and merging the binary bit representation of the pseudo bar code string with a binary bit representation of a document image into a composite bit stream. The first image station is coupled to a communications link, to a second image station. The first station is capable of transmitting the composite bit stream and the second station is capable of receiving the composite bit stream.

In one preferred embodiment, the two image stations are facsimile stations both of which are aware of pseudo bar code transmission and the communications link is the Public Switched Telephone Network. In this embodiment, the second station is also capable of recognizing and translating the binary bit representation of the pseudo bar code from the composite bit stream back into either the original alphanumeric character string or the pseudo bar code string corresponding to the alphanumeric string. The second station can utilize either of these strings to carry out routing, indexing or other processing of the facsimile image.

In another embodiment of the invention, the second station is not aware of the pseudo bar code. Because the pseudo bar code is compatible with the established conventions for facsimile and image handling, no error is caused by the presence of the portion of the composite bit stream representing the pseudo bar code. The pseudo bar code is typically printed as a thin line of smudgy dots at the top of the printed image.

The pseudo bar code is a machine readable code with error detection capabilities similar to those designed into the standard bar codes and can easily be converted into images which are transmitted using CCITT facsimile standards.

The invention embraces all image communication systems, and most specifically facsimile communication between computer based facsimile systems, or between computer based facsimile and conventional facsimile systems, and between conventional facsimile systems modified to incorporate this invention.

The alphanumeric character string is produced from manual input on a keyboard or derived from other sources of information needed for the indexing or routing of the image. The image can be obtained from a variety of image sources such as an image scanner, a facsimile machine, computer generated images of text and graphics or previously stored image files at the first station.

BRIEF DESCRIPTION OF THE DRAWINGS

The above and other objects, features and advantages of the present invention will be better understood with reference to the following figures.

FIG. 9 is a truncated table of CCITT Group 3 codes for use in the present invention.

DETAILED DESCRIPTION OF THE DRAWINGS

Figure 1:
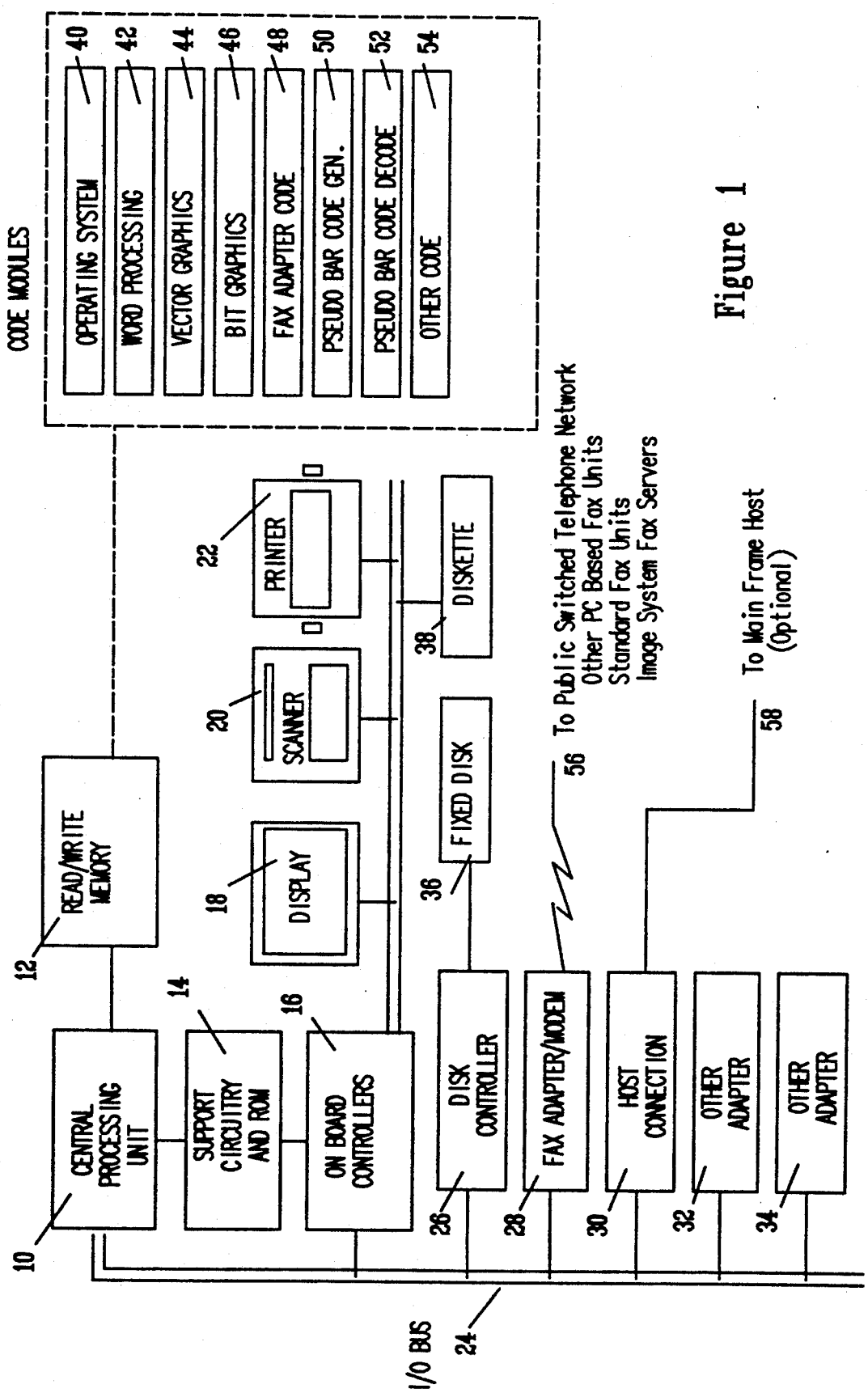
FIG. 1 is an architectural block diagram of a first station of a data processing system in accordance with the present invention.

This invention can be practiced by means of specific hard connected logic elements and storage elements, or can be practiced by means of programming or firmware on a small general purpose computer, such as the IBM PC or PS/2. FIG. 1 describes the block diagram of apparatus comprising a small general purpose computer, complete with display means 18, scanning means 20, printing means 22, a variety of storage means 12, 26, 36, 38, Facsimile integration means 28, host attachment means 30 and code modules 40-50 which contain the necessary instructions to enable these interconnected elements in FIG. 1 to perform the method of this invention as well as other general tasks.

The Central processing unit 10 provides program controlled logic for executing its instruction set, where the instructions are derived from the Read/Write memory 12. Support circuitry (14) and Read Only Memory (ROM) provide the timing control, Direct Memory Access (DMA) and other support functions for general purpose processing of digital data. The On Board Controllers 16 which are typically found in modern Personal Computers provide the circuitry and in some cases memory and ROM based code. The typical devices supported by the on board controllers include Displays 18, Scanners 20, Printers 22, and Diskette storage 38 connected by a - - - bus 21. Other commonly used peripheral equipment will be supported by on board controllers in the future. These systems also provide an I/0 bus 24 which permits the attachment of controllers and adapters not sufficiently common to all applications to be included in the on board set. Typical adapters which may be placed on the I/O bus include a fixed disk controller 26, a Host connection Adapter 30 and facsimile Adapters/Modems 28, which are particularly applicable to the practice of this invention.

Host adapters 30 may include Ethernet connections or IBM 3270 connections, or Token Ring Adapters for communication with host systems, and also between PC systems. This connection is largely by Synchronous Binary communications means. Facsimile adapters 28 permit the transmission of images or graphical representations between similarly equipped computers, or dedicated function facsimile machines.

An operating system 40 such as DOS, OS/2, or AIX (Unix) is required for the fundamental functioning of the computer, and provides for most common housekeeping functions, such as operation of storage, printing, display, etc. A number of other code modules may reside on the system at different or the same times depending on the nature of the operating system. Among the code modules which would be needed in the practice of this invention are the facsimile Adapter code 48 Pseudo Bar Code generation code 50, and the Pseudo Bar Code decoding code 52 which are resident in memory 12.

Using a general purpose computer for facsimile operations to send a facsimile image, the document is placed in the Scanner 20 where it is converted into digital bit level bit map form in memory 12 or disk storage 36. The facsimile adapter code 48 takes this stored bit map and performs compression, preferably using the CCITT Group 3 or Group 4 compression methods. The methods measure runs of white and black picture elements along the scan lines, converting them into codes defined for the CCITT Group 3 or Group 4 systems. These codes are part of an open code set so designed that it is possible by comparison of bit patterns in the concatenated data stream with known code bit patterns to parse the stream into the individual codes denoting run length or other image defining information. In this manner, it is not necessary to operate on specific byte boundaries, or to use separator codes.

To generate the alphanumeric character string which will be converted to the pseudo bar code, the operator of the system enters via the keyboard 15 alphanumeric character data preferably in defined fields, such as Name, Address Customer number, Form number, Date, Department number, Addressee, etc. An application program could easily be written to prompt the user to enter the various fields. This information is used by the Pseudo Bar Code generator code 50 module to produce a sequence of binary bits equivalent to a standard or pre-agreed bar code, or other form of code which includes error checking capability such as that inherent in the bar codes. The compressed facsimile image is concatenated to this binary bit stream, and the composite bit stream is transmitted by the facsimile Modem (28) over the PSTN or other communications link.

The binary bit stream containing the indexing or routing information is itself an open code set with unique synchronizing start and stop characters, which provide for reliable detection of errors in the code characters. This sequence appears to a receiving facsimile or other image system (not shown) to be a legitimate stream of codes representing image data. Indeed, if printed would represent a bar code one scan line in height and at maximum resolution. Receiving systems whether they are aware of the pseudo bar code routing-/indexing information or not, therefore, are not disturbed, and full compatibility is maintained with conventional facsimile machines.

If the receiving system tied to the PSTN (56) over which the transmission occurs is a personal computer based, with the appropriate code, or is a dedicated facsimile terminal with this invention incorporated. The information placed in the image as a pseudo bar code then is utilized for indexing, routing, forwarding or other processing of the facsimile image, without necessary intervention by an operator. It is known by such aware systems that the indexing data stream of the pseudo bar code will appear to be the first line of the compressed image. Depending on the coding method employed, there may be four to eight unique codes that are used in this sequence, simplifying the parsing and decoding operation immensely.

In the popular Code 39 bar code, there are four Modified Huffman codes which must be detected. These codes are 0111,1011,11, and 011. The Pseudo Bar code decode module strips 52 off the 1st line of the image, decodes the Modified Huffman (MH) run length codes into Black and White bar widths. Next, the decode module 52 subsequently decodes the black and white bar widths into the originally generated alphanumeric character data stream comprise the full numeric set, upper case Alphabetic set, and some special characters. The bar code data can be encoded at any desired density, for example, MH codes for a 2 pel narrow bar and a 4 pel wide bar. The initial or start character enables the pseudo bar code decode module 52 to determine the density used. The decoded ASCII characters are then used to define the routing, destination, or storage index, thus permitting incoming facsimile messages to be handled without an operator. In an alternate, but less preferred embodiment, the black and white stripe of the pseudo bar code itself is used to define routing or indexing procedures without translation to the alphanumeric character stream. The received facsimile messages can be displayed on the display 18, or printed on the printer 22, or may be sent to a Host computer via host connections 30 and host communication line 56, or via the facsimile modem 28 and the PSTN 56 to another facsimile system, with the same or new imbedded routing/indexing information.

Figure 2:
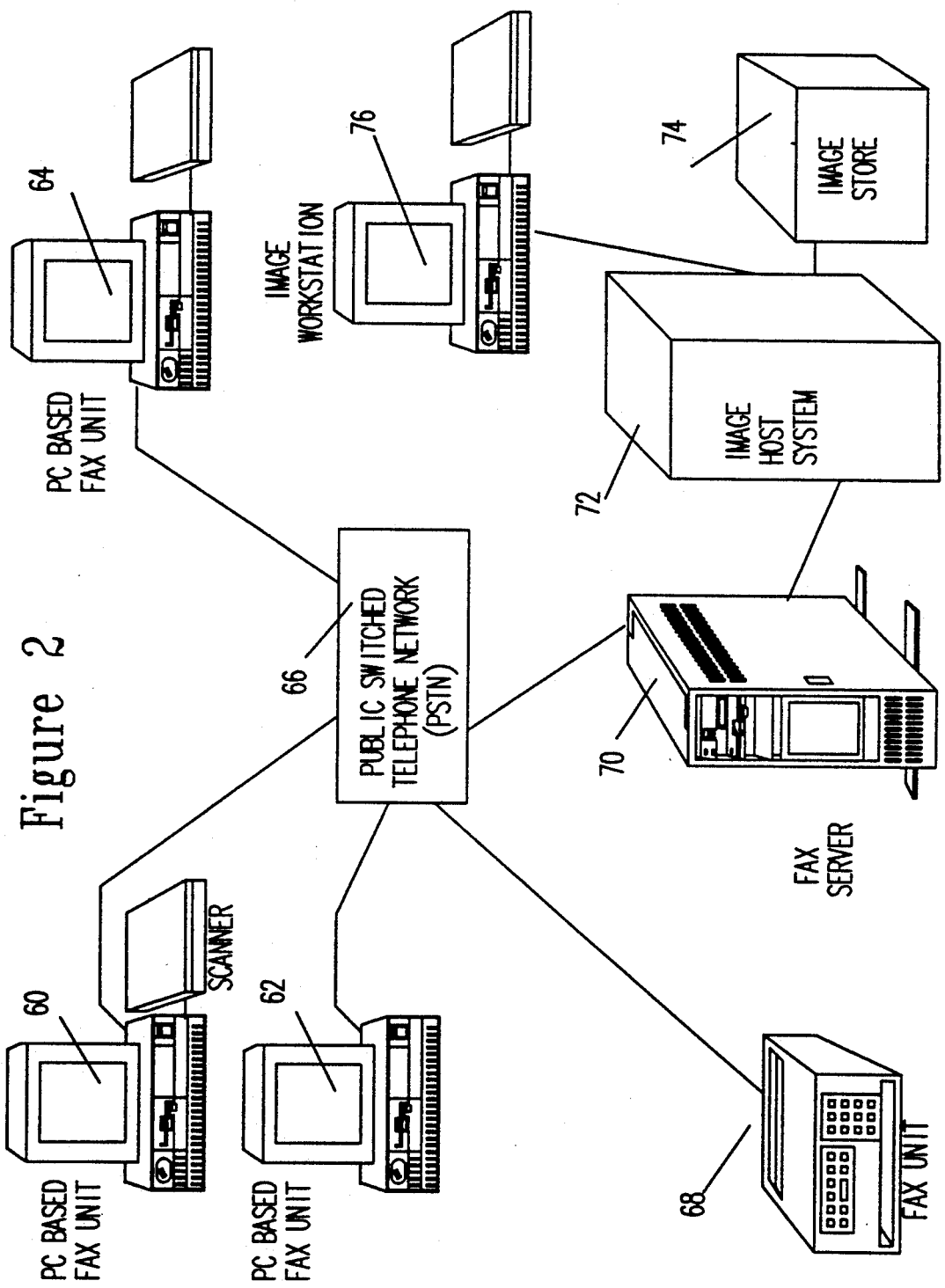
FIG. 2 shows the network of devices which practice the method of the present invention.

FIG. 2 depicts a network interconnection of devices practicing this invention. A personal computer based facsimile unit 60 similar to that portrayed in FIG. 1 may scan a document, or create a document using a word processing 42 and graphics 44 programs which has never been on paper for transmission by facsimile. In practicing the present invention, the unit 60 incorporates the imbedded Pseudo Bar Code information in the image to provide routing and indexing information to a recipient image station. The facsimile adapter 28 sends the facsimile transmission over the PSTN 66 to any other system on the network. If transmitted to the standard facsimile unit 68 the image is simply printed, and the pseudo bar code appears as a line of smudgy dots in the top white margin of the document. If transmitted to the other personal computer based facsimile units 62 or 64 on the PSTN 66, it may be viewed, printed if a printer is attached, or forwarded via its facsimile adapter modem 28 to another facsimile system based on the data in the pseudo bar code imbedded in the image. If the facsimile is received by a facsimile server unit 70 attached to a computer based image system 72 such as IBM ImagePlus, the facsimile may be stored in the image system disk storage 74, forwarded to another facsimile system 60, 62, 64, or 68, or distributed as an image to a non facsimile capable image workstation 76 based on the data in the pseudo bar code.

Figure 3A:
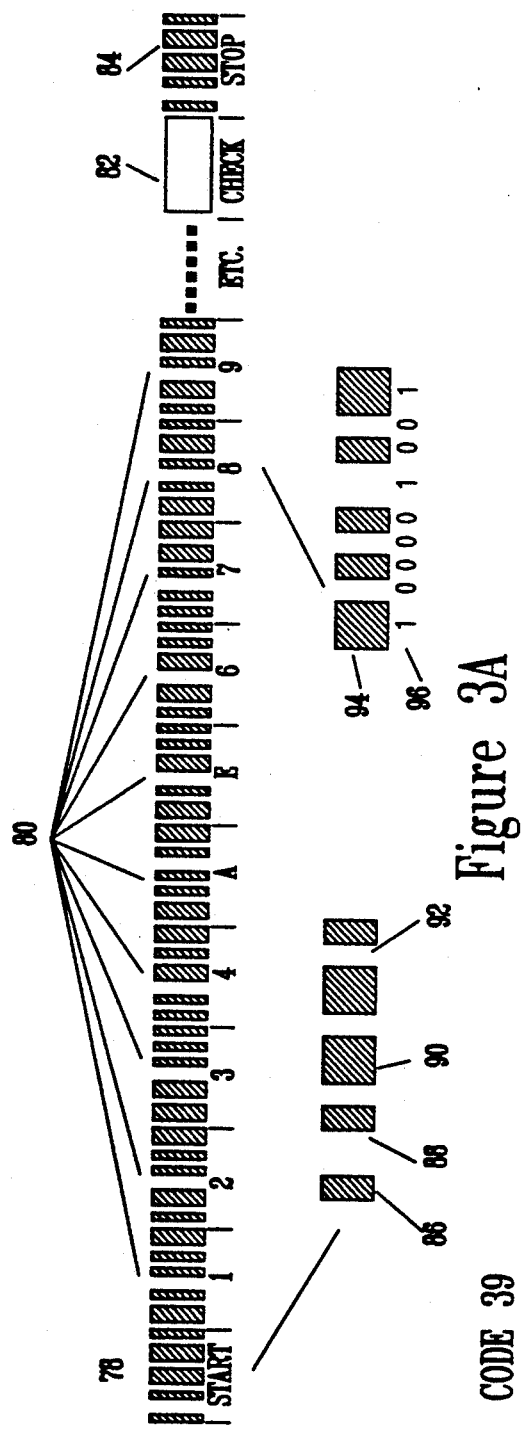
FIG. 3A and 3B illustrates two of the commonly used bar codes adaptable to practice the present invention.
Figure 3B:
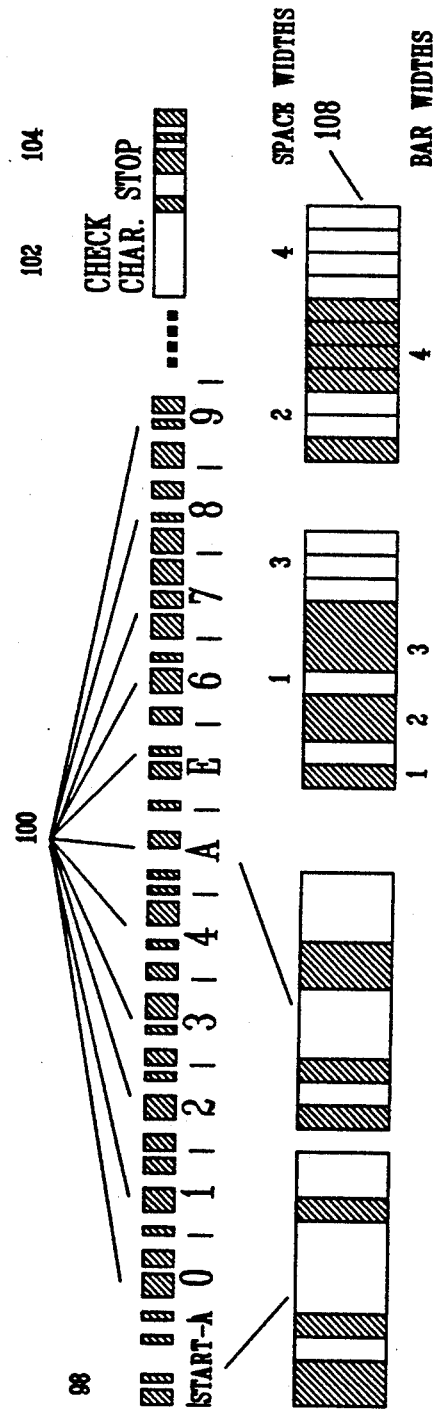

FIGS. 3A and 3B illustrates two of many applicable bar code systems for the practice of this invention, code 39, and code 128.

FIG. 3A shows a typical string of bar codes in code 39, with a start character 78, data characters 80, a check data character 82, and a stop character 84. The start 78 and stop 84 characters are identical and contain information needed to define the widths of the bars and spaces in the ensuing code patterns. In code 39, the first bar in the start/stop pattern is always a narrow black bar 86, and the white space following is a wide white space 88. Measurements of these initial widths provides the necessary information to read the entire code regardless of pattern density. A data character 94 representing the letter A is illustrated with a 3 of 9 binary bit representation of the bar pattern 96 below it. Wide bars/spaces are valued as 1, and narrow bars/spaces as 0. The use of 9 binary bits to represent 44 characters which would normally require only 6 binary bits, provides the open code set needed to permit detection of error character patterns. If code 39 is used and a character has more/less than three wide spaces/marks or more/less than 9 total spaces/marks, it is rejected. Also, if it does not correspond to one of the specified patterns in the code, it is rejected.

FIG. 3B illustrates a typical stream of bar code patterns in Code 128. This pattern is initiated with a start character 98 followed by data characters 100, a check character 102, and a stop character 104. The detailed code patterns for the start character 106 and the character A 108 are shown in the Figure and the permitted bar and space widths are illustrated. In code 128, each character is 11 units long, and may contain bars of 1, 2, 3, or 4 units in width. Spaces may similarly be 1, 2, 3, or 4 units in width. This code permits the representation of the full 128 character ASCII set in code 128 bar codes. It, too, is an open code set which provides for error detection. In this code set, 11 bit spaces are used for 7 bits worth of information. If this code is used in the practice of this invention, 8 unique Huffman codes would be required corresponding to 1, 2, 3, and 4 element runs in both black and white.

Other bar code structures which might be used in the practice of this invention include, but are not limited to, Code 2 of 5, Code 93, Codabar, and variations of the UPC code. Any self checking code structure which can be represented by run lengths can be used as the pseudo bar code.

Figure 4:
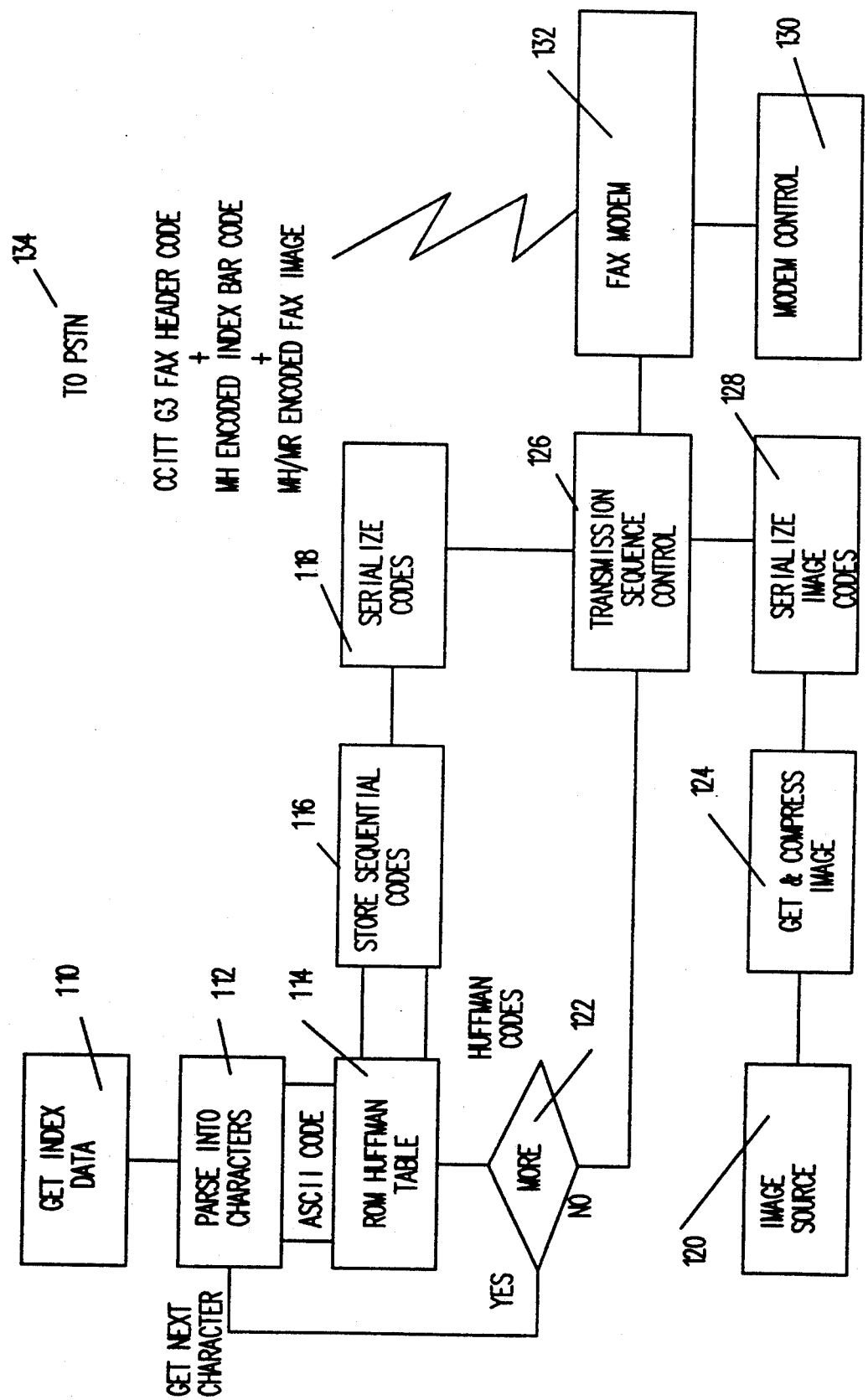
FIG. 4 depicts a flow diagram of the generation of a facsimile image which contains the indexing/routing information in pseudo bar code form in accordance with the present invention.

FIG. 4 illustrates in flow diagram form, some of the procedures used in generating a composite bit stream representation of a pseudo bar code routing/indexing stream and a document image in the practice of this invention. The indexing/routing information is obtained from its source in step 110 and parsed into individual characters in step 112. As mentioned previously, the alphanumeric character string can be generated by keyboard input by the user, or may be received from completely different sources. For example, optical character recognition or other image processing might identify a particular alphanumeric character string in a predefined field on a scanned image. This particular alphanumeric character string could be converted as identified into the pseudo bar code, or might be processed into another alphanumeric character string which contains the agreed format for routing/indexing information prior to conversion to pseudo bar code. The ASCII code of each successive character is used as the address in a RAM or ROM table in step 114 of valid Huffman codes representing the appropriate bar code for that character. A test is made to see if there are any more characters to be processed in step 122 and the processing continues until no more characters are available. The Modified Huffman code of the pseudo bar code for each character are stored in sequential fashion in step 116 in either parallel or serial form.

In FIG. 4, the facsimile image is obtained from the image source in step 120. This source may be from a scanner 20, a bit map file on a personal computer fixed disk 36, a compressed image file from the Image store 74 of image host system 72, or one generated from text and graphic processors 42, 44 and converted by the facsimile program 48. If not already compressed, the facsimile image is compressed in step 124 using CCITT Group 3, Modified Huffman (MH) or Modified Read (MR). When all index/routing data is processed, control passes to the transmission sequence control block in step 126, which initializes the facsimile communication through the Modem Control, step 130 and then merges the data streams by transmitting in sequence the pseudo bar code data stream, followed by the serial image data stream via the facsimile modem in step 132 to the PSTN 56 in step 134.

Figure 5:
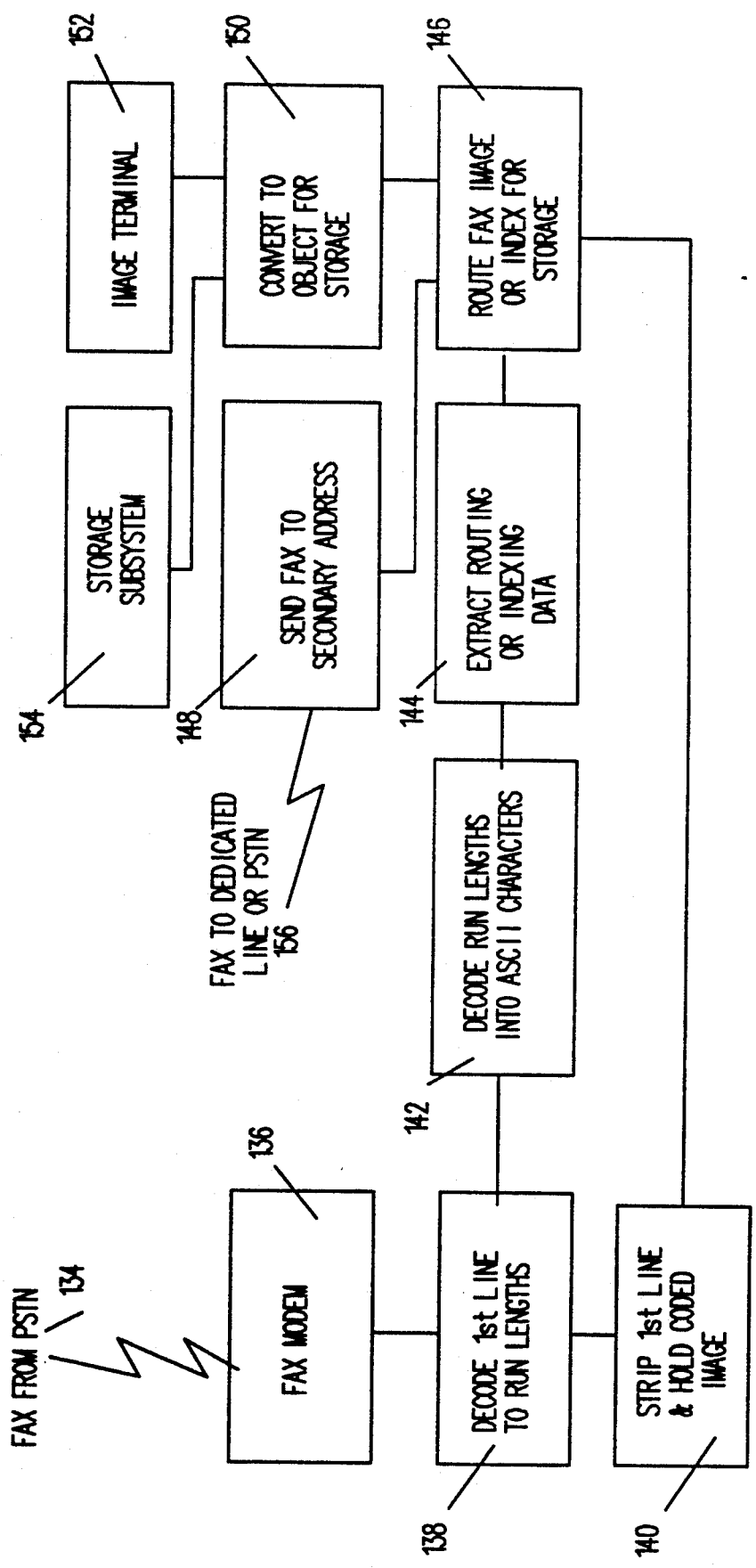
FIG. 5 depicts a flow diagram for the reception of a facsimile image which contains the indexing/routing information in pseudo code bar form.

FIG. 5 illustrates the procedures for the reception of an image which contains the indexing/routing information in pseudo bar code form in practice of this invention. The facsimile message is received from the Public Switched Telephone Network (PSTN) 56 by the facsimile modem in step 136 on the Adapter card 28 of a personal computer or the facsimile modem in a facsimile machine in a second image station practicing this invention. The first line of image is decoded to black and white run lengths in step 138. The presence of a multiplicity of four specific run length codes, or a multiplicity of black and white runs of 1 and 2, or 1,2,3, and 4 units in length indicates the presence of a pseudo bar code in the line. The conversion to run lengths is facilitated by the fact that there are only 4 to 8 Huffman codes which need be detected and decoded, depending on the pseudo bar code employed. The first line of the compressed image is stripped off and the remainder of the compressed image is stored temporarily for indexing or routing, step 140. The decoded run lengths are converted to ASCII characters in step 142 according to a translation table used for the other bar code or other code employed in the transmission. As the aware image station understands that the pseudo bar code stream occurs first in the composite bit steam, the ASCII character data is processed to extract the fields containing routing or indexing information, in step 144, and the facsimile image is routed to one of several paths based on the index/routing information in step 146. This routing could be to a facsimile modem as shown in step 148 with new index/routing information or without this data for transmission to a secondary facsimile address in step 156. Alternatively the facsimile image could be routed to a module to convert the facsimile image for storage in step 150, thence to an image terminal 76, step 152 or to a storage subsystem 74 in step 154.

Steps 150, 154, and 152 summarize the use of the present invention in an image storage/retrieval system to which a multiplicity of image terminals might be attached. In this manner, internal distribution of incoming facsimile documents to the end user can be accomplished automatically. Further, although not depicted in FIG. 5, the image system. 72 could apply alternative processing to the transmitted image before storage, transmission or display to the end user. The pseudo bar code bit stream can contain several fields which indicate the type of form on which the image is placed and instructions for partitioning data in the transmitted image. For example, many industries have many copies of standard forms on which only a few fields of customer unique information are placed. It would be advantageous to store the form only once i the image storage facility 74. Thus the pseudo bar code could contain a specific alphanumeric character in a particular field which instructs the image host 72 to strip away the image data associated with the form on customer transmitted or otherwise generated documents and store only the customer unique data in image storage 74. Alternatively, since the agent is presumably familiar with the standard for, only the customer unique data need be presented on the image workstation 76. Other applications will undoubtedly occur to those skilled in the art of image processing such as classifying the image document by image type or the form on which the image is presented.

Figure 6:
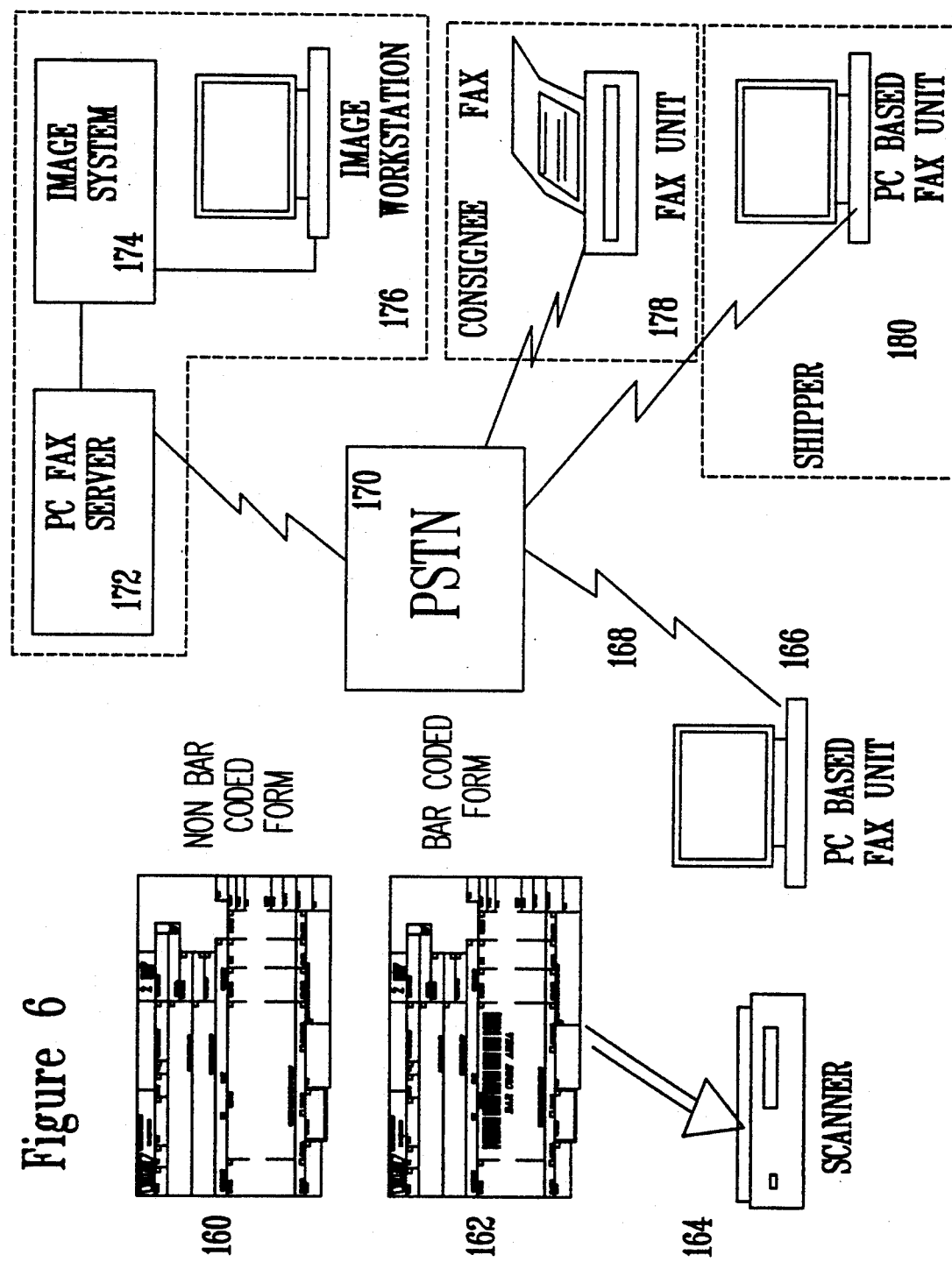
FIG. 6 shows a network of devices in a preferred embodiment of the invention.

FIG. 6 illustrates how this invention might be applied in a typical user situation. In this instance, a trucking company generates or receives from the shipper several forms such as Bills of Lading, or Delivery receipts which are a part of the contract for transportation of freight. Some companies have bar coded these forms with minimal information used for tracking purposes as the freight is transported from the shipper to the destination and various company terminals in between. This bar code contains a unique number which identifies a particular parcel. Other important information on the document needed for indexing/routing can not be included in the bar code due to physical space limitations. The printed bar code also occupies space which can force the use of additional pages. Both a non bar coded (160) and a bar coded (162) version of a delivery receipt are illustrated. These forms when signed by the consignee represent completion of the contract for carriage, and are generally forwarded from the remote freight terminal to a central records site for storage and further processing.

Much to the trucking company's chagrin and expense, it has been found that many consignees will not pay for merchandise until proof of delivery is received, thus making use of the float on the payment. It is therefore in the shipper's interest to be able to prove receipt at the earliest possible time. To accommodate its customers, the trucking companies could expedite the processing of the freight receipt by means of facsimile and Image systems according to the present invention. In this example, the delivery receipt would be scanned by scanner 164 and sent by PC Based facsimile 166 to the central processing site 174 via Telephone lines 168 and the PSTN 170. The facsimile would include index information such as the unique parcel number, Shipper & Address, Consignee & Address, Date delivered, etc. in the pseudo bar code in accordance with the invention. The facsimile is received at the facsimile server 172 of the central imaging system 174, which could route the image to a particular image workstation 176 for further processing, or could reroute the facsimile image via the PSTN 170 to either the shipper 180, as proof of delivery, or directly to the consignee 178, if so desired by the shipper, or both. This is possible as the pseudo bar code contains information identifying the shipper and consignee. Based on the past behavior of a particular consignee, or a general practice of a particular shipper, actions can be taken automatically by the central image system when a particular shipper or consignee code is detected. All of these actions could take place using this invention, without human intervention, thus saving cost and reducing cycle time for receipt of payment by the shipper.

Figure 7:
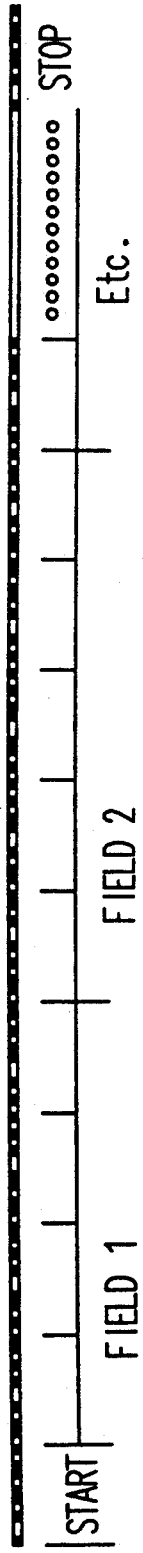
FIG. 7 depicts a printed image of the pseudo bar code in truncated form.
Figure 7:
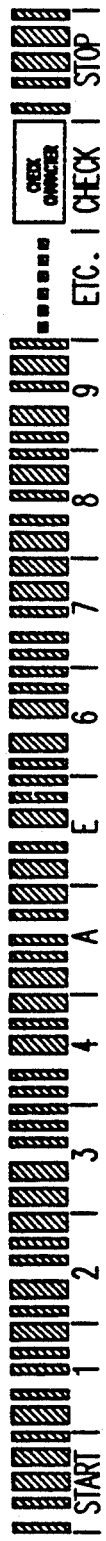

FIG. 7 illustrates in truncated form what the Pseudo Bar code would look like if printed as an image, and the equivalent printed Bar code in Code 39 format. As shown in FIG. 7, the pseudo bar code is one pel high in contrast to the printed bar code which would be 50 or more pels height for accurate bar code scanner recognition. Other bar codes and self checking codes are equally usable in the practice of the present invention. The pseudo bar code may be divided into fields as illustrated, of arbitrary length, each field contains an element of indexing, routing or processing information. Each pseudo bar code line also includes a start character, a check character for positive error checking, and a stop character to indicate the end of the code pattern. It should be emphasized that in an aware data processing system, after the pseudo bar code is stripped off to examine the routing and indexing information, it is generally not printed on the document. However, it is possible to instruct the aware system to print the pseudo bar code, in traditional bar code height so that a bar code scanner could be utilized with the printed document. The command to print the bar code could be contained in one of the fields of the pseudo bar code.

Figure 8:
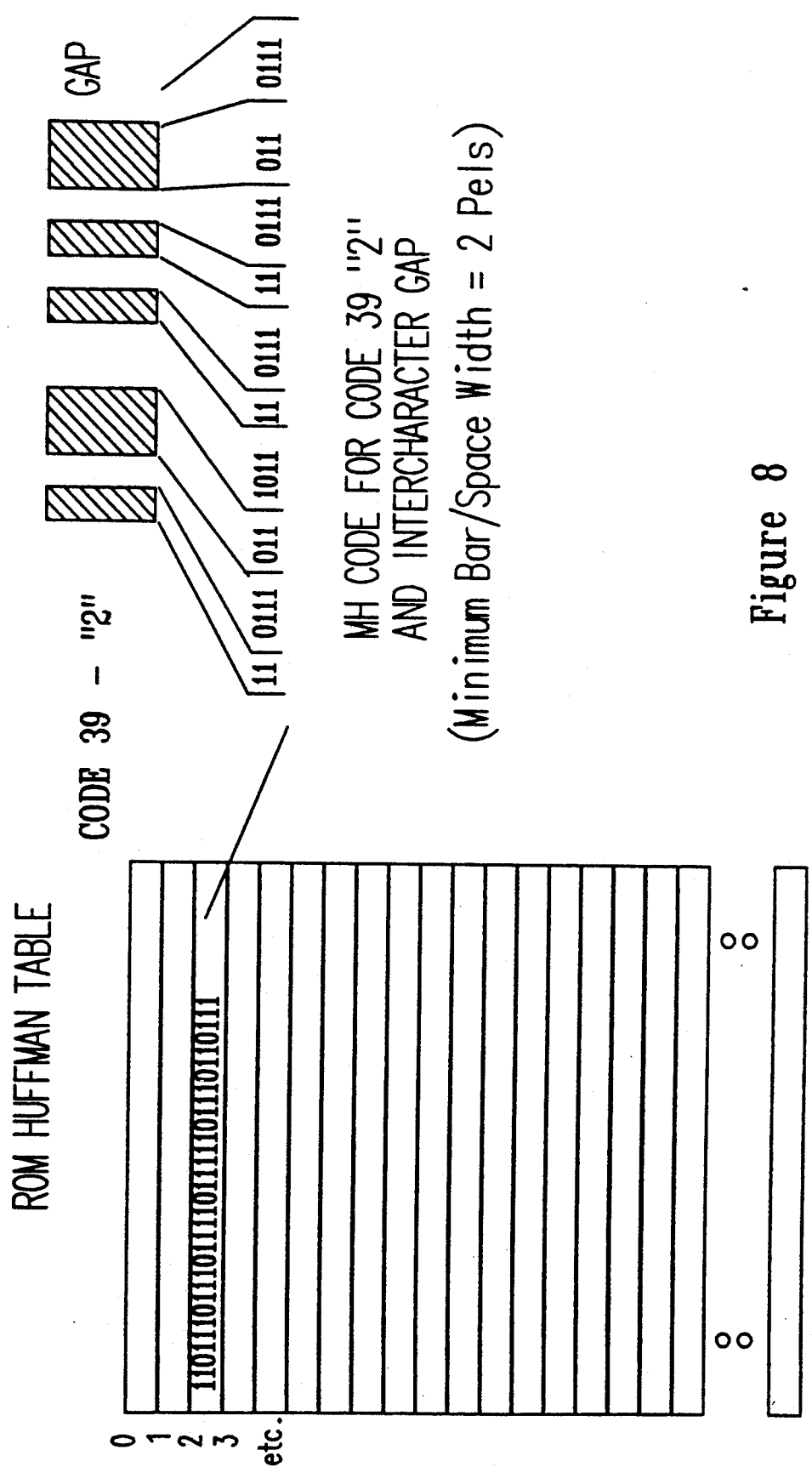
FIG. 8 illustrates the table of Modified Huffman codes to be used to generate facsimile compatible pseudo bar codes.

FIG. 8 illustrates how a table of Modified Huffman codes representing the concatenated black and white run length codes of CCITT group 3 facsimile can be used to simplify the generation of the Pseudo Bar code patterns in Modified Huffman form which is facsimile compatible. A table containing a number of words of code is organized in memory or Read Only Memory (ROM) such that when addressed by the ASCII representation of a character, the appropriate set of Modified Huffman codes is placed in the image data stream. The MH codes for each black and white run length in the code 39 character "2" are shown below the character. Two pels are used for the width of the narrow bar/space and 4 pels are used for the wide bar/space. This density would accommodate more than 30 code characters. The use of one and two pel runs respectively would permit more than 60 characters in a line. If greater numbers of characters are required additional pseudo bar code lines can be used without effect on the facsimile image compatibility.

FIG. 9 illustrates a truncated table of CCITT Group 3 Modified Huffman codes for run lengths in both black and white of 1 to 6 units. It is observed that the code for a white run of one pel is six bits in length, while the others are only two to four bits in length. It is only necessary to preserve the CCITT Group 3 compatibility that the codes be acceptable MH codes, a set of codes can therefore be used which are optimized on length. One such set is illustrated, however all such optimized code sets comprising combinations of legitimate MH codes, where the run lengths are interpreted differently in the bar code decoding process that in the decoding of the compressed image data of the transmitted document are included in this invention.

A brief description of modified Huffman (MH) encoding and Modified Read used in facsimile and image data compression follows. MH encoding is a method of encoding of the run lengths of White and Black pels in digital facsimile images, under CCITT Group 3 protocols. Each line starts with a white run, even if of 0 length. The next run is black, and runs successively alternate between black and white. The length of each black or white run is coded by a Modified Huffman code from a set of code tables, where the shortest codes are assigned to the most probable run lengths. Huffman codes are a code set in which each code is uniquely separable from other codes when concatenated without separators.

Modified Read (MR) is a method of digital coding used in the two dimensional mode of CCITT Group 3 Facsimile protocols. MR encoding uses MH coding for the first image line, saves the bit pattern as a reference, and compares the next lines bit pattern against this reference. Three modes are detected and used in coding this line. The first mode is pass mode, which receives the code 0001, and occurs when a pair of contrast boundaries, white to black to white in the reference line are bassed without a contrast boundary in the line being coded. The second mode is the Vertical mode, where a contrast boundary is directly below a contrast boundary in the reference line, or no more than three pels to the left or right. Seven short codes are provided for these conditions. In the event neither a pass mode condition or vertical condition is detected, the default is a horizontal mode. This causes encoding of the current white run and Pass mode or vertical starting at the first white pel after the encoded black run. Depending on the resolution in use, standard, or fine, every other line is coded as MH, or for fine mode, every fourth line is encoded as MH. This ensures resynchronization without seriously disrupting the image.

There is another compression method called Modified modified read (MMR) which is used in CCITT Group 4 compression MMR is almost identical to MR except that all lines after the first line are normally encoded as MR lines. The value of K which determines the number of lines which may be encoded as MR in CCITT G3 becomes infinite. MMR also eliminates the end of line codes, and shortens the end of image code.

Further information on MH and MR compression codes can be found in the CCITT "Red Book". It is officially a publication of the International Telecommunication Union, The International Telegraph and Telephone Consultive Committee. It is titled RED BOOK, Vol. VII—Fascicle VII.3, Terminal Equipment and Protocols for Telematic Service, Recommendations of the T Series, VIIIth Plenary Assembly, Malaga-Torremolinous, 8–19 October 1984, Geneva 1985. The ISBM number is ISBN 92-61-02291-X.

Figure 10:
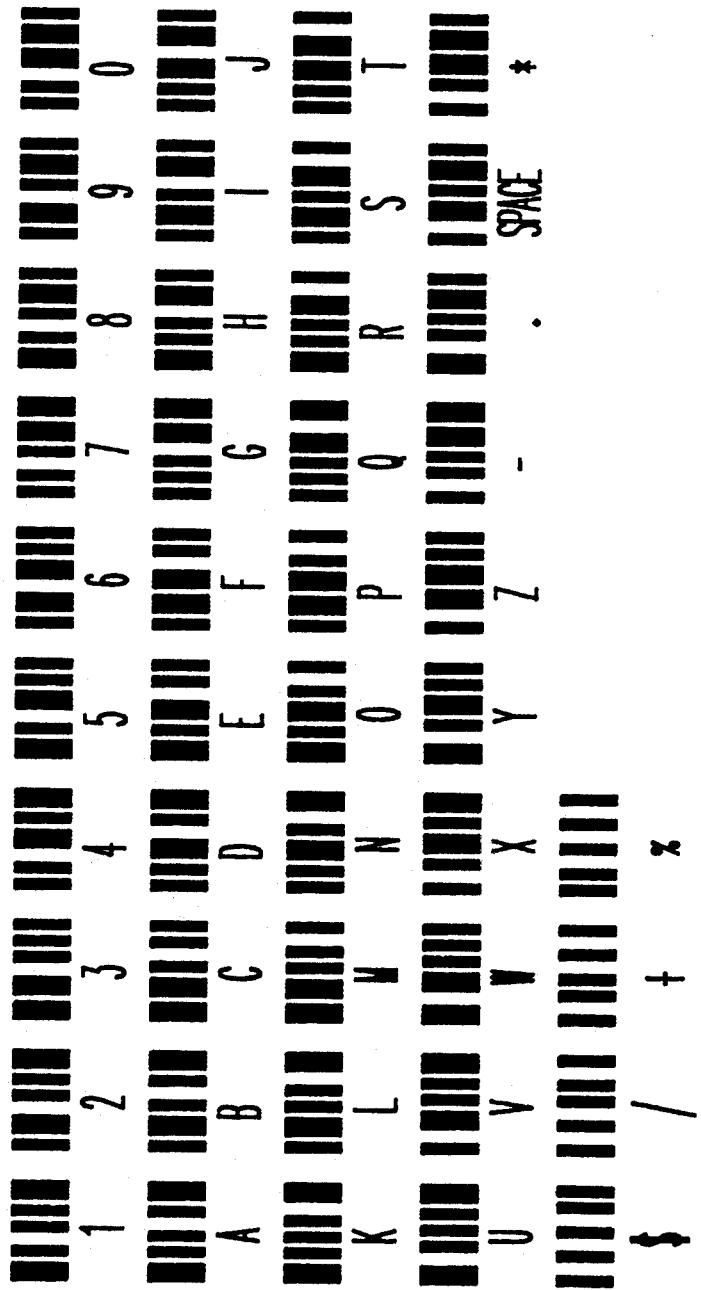
FIG. 10 is a complete set of all the character codes in bar code 39.

A complete set of bar codes in code 39 for the alphanumeric characters is shown in FIG. 10. In addition to the alphanumeric characters, bar codes corresponding to the −, ., $, /, + and % characters are also included. These characters would be useful in delimiting fields within the pseudo bar code bit stream where the fields are desired to be of unlimited length as opposed to a defined number of characters.

While the invention has been described with respect to several illustrative examples, it would be understood by those skilled in the art that modifications may be made without parting from the spirit and scope of the present invention. For example, the examples discussed above are primarily concerned with image transmission using facsimile or a combination of facsimile and image systems. There is nothing to prevent the use of the present invention totally within a dedicated image system, for instance, the storage and handling of video images within a multimedia storage system using a imbedded pseudo bar code data stream. Other means of generating the pseudo bar code data stream such as through the use of a bar code scanner would occur to those skilled in the art. The embodiments presented above are for purposes of example only and are not to be taken to limit the scope of the appended claims.

I claim:

1. In a data processing system including a first station coupled over a communications link to a second station, a method for transmitting alphanumeric character information with document image information, comprising the steps of:

inputting an alphanumeric character having a corresponding bar code character image, at a first station;

storing at said first station, a translation table which is addressble by said alphanumeric character, said table storing a binary bit representation of said bar code character image corresponding to said alphanumeric character;

providing a binary bit document storage stream representing document image at said first station;

merging at said first station said binary bit representation of said bar code character image representing said alphanumeric character, with said binary bit document image stream, forming a composite bit stream;

transmitting from said first station over a communications link to said second station, said composite bit stream; and, receiving said composite bit stream at said second station and detecting said binary bit representation of said bar code image representing said alphanumeric character;

wherein said step of storing a binary bit representation at said first station, further comprises the step of:

storing a run length representation of said bar code character image corresponding to said alphanumeric character, by storing a Huffman Code representation of said run length code representation of said bar code character image.

2. The method of claim 1, wherein said step of scanning a document image, further comprises the step of:

converting said document image into a Huffman Code representation of a run length code representation of said document image.

3. The method of claim 2, wherein said step of merging, further comprises the step of:

inserting said binary bit representation of said bar code character image at the beginning portion of said binary bit document image stream.

4. In a data processing system including a first station coupled over a communications link to a second station, a method for transmitting alphanumeric character information with document image information, comprising the steps of:

inputting an alphanumeric character having a corresponding bar code character image, at a first station;

storing at said first station, a translation table which is addressable by said alphanumeric character, said table storing a binary bit representation of said bar code character image corresponding to said alphanumeric character;

providing a binary bit document storage stream representing a document image at said firs station;

merging at said first said binary bit representation of said bar code character image representing said alphanumeric character, with said binary bit document image stream, forming a composite bit stream;

transmitting from said first station over a communications link to said second station, said composite bit stream; and, receiving said composite bit stream at said second station and detecting said binary bit representation of said bar code image representing said alphanumeric character;

translating at said second station, said binary bit representation of said bar code image, into said alphanumeric character and outputting said alphanumeric character;

said step of translating further comprising of the steps of:

detecting said binary bit representation of said start code character image and identifying it as a valid bar code character;

accessing a stored representation of candidate alphanumeric character images at said second station in response to said identification of said bar code start character;

comparing said binary bit representation of said bar code character image representing said alphanumeric character with said candidate alphanumeric character images;

selecting in response to said comparing step, a candidate alphanumeric character image which is equivalent to said binary bit representation of said bar code character image representing said alphanumeric character.

5. In a data processing system including a first station coupled over a communications link to a second station, an apparatus for transmitting alphanumeric character information with document image information, comprising:

an input means at a first station, for inputting an alphanumeric character having a corresponding bar code character image;

a memory at said first station, coupled to said input means, having a translation table therein addressable by said alphanumeric character, for storing a binary bit representation of said bar code character image corresponding to said alphanumeric character;

a document image pickup means at said first station for scanning a document image and converting it into a binary bit document image stream;

a merging means at said first station having an input coupled to output of said memory and an input coupled to an output of said image pickup means, for merging said binary bit representation of said bar code character image representing said alphanumeric character, with said binary bit document image stream, forming a composite bit stream;

a transmitting means coupled to said merging means for transmitting said composite bit stream from said first station over a communications link to a second station;

a detection means at said second station, for receiving said composite bit stream and detection said binary bit representation of said bar code image representing said alphanumeric characters; and, bar code translation means at said second station coupled to said detection means for outputting said alphanumeric character in response to detecting said binary bit representation of said bar code image in said composite bit stream;

wherein said document image pickup means, further comprises:

a facsimile input device for scanning a document image and converting it into a facsimile document image stream;

said translation table in said memory at said first station storing a Huffman Code representation of a run length representation of said bar code character image corresponding to said alphanumeric character;

said document image pickup means converting said document image into a Huffman Code representation of a run length representation of said document image;

said merging means inserting said Huffman Code representation corresponding to said alphanumeric character at a beginning portion of said Huffman Code representation of said document image.

6. In a data processing system including a first station coupled over a communications link to a second station, an apparatus for transmitting alphanumeric character information with document image information, comprising:

an input means at a first station, for inputting an alphanumeric character having a corresponding bar code character image;

a memory at said first station, coupled to said input means, having a translation table therein addressable by said alphanumeric character, for storing a binary bit representation of said bar code character image corresponding to said alphanumeric character;

a document image pickup means at said first station for scanning a document image and converting it into a binary bit document image stream;

a merging means at said first station having an input coupled to output of said memory and an input coupled to an output of said image pickup means, for merging said binary bit representation of said bar code character image representing said alphanumeric character, with said binary bit document image stream, forming a composite bit stream;

a transmitting means coupled to said merging means for transmitting said composite bit stream from said first station over a communications link to a second station;

a detection means at said second station, for receiving said composite bit stream and detection said binary bit representation of said bar code image representing said alphanumeric character;

bar code translation means at said second station coupled to said detection means for outputting said alphanumeric character in response to detecting said binary bit representation of said bar code image in said composite bit stream;

said transmitting means at said first station transmitting a binary bit representation of a bar code start character image in said composite bit stream proximate to said binary bit representation of said bar code character image representing said alphanumeric character;

said detection means at said second station detection said binary bit representation of said bar code start character image in said composite bit stream;

a candidate memory as said second station coupled to said detection means for storing a plurality of binary bit representations of bar code character images corresponding to alphanumeric characters; and comparison means at said second station coupled to said detection means and to said candidate memory, for comparing said binary bit representation of said bar code character image corresponding to said alphanumeric character received over said communications link, with said candidate, for selecting a candidate image equivalent to said received bar code character image.

* * * * *